Figure 1:
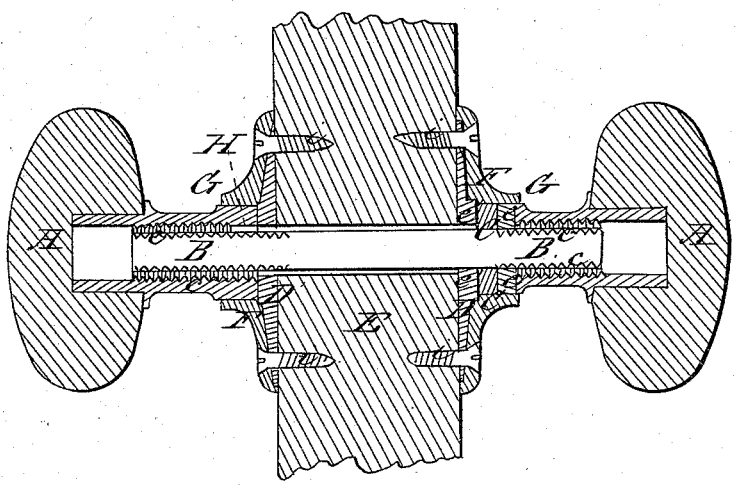

E. Parker,
Knob Attachment.
Nº 43,332. Patented June 28, 1864.

Witnesses

Inventor
Emery Parker

UNITED STATES PATENT OFFICE.

EMERY PARKER, OF WEST MERIDEN, CONNECTICUT.

IMPROVEMENT IN MODE OF ATTACHING DOOR-KNOBS TO THEIR SPINDLES.

Specification forming part of Letters Patent No. 43,332, dated June 28, 1864.

*To all whom it may concern:*

Be it known that I, EMERY PARKER, of West Meriden, county of New Haven, and State of Connecticut, have invented a certain new and useful Additional Improvement in the Mode of Attaching Knobs to Spindles, patented to G. N. Cummings, July 22, 1862, reissued March 29, 1864, No. 1,645; and I do hereby declare that the same is described and represented in the following specification and drawings; and to enable others skilled in the art to make and use, I will proceed to describe its construction by referring to the drawings, in which the same letters indicate like parts in each of the figures.

The nature of this improvement will be fully understood from the specification and drawings, the object of which is to produce the most ready, easy, and perfect adjustment of the knob-shank to the thickness of the door, from either end of the rod or spindle, and at the same time provide a hard or metallic bearing for the end of the knob shank, separate and distinct from the escutcheon.

Figure 2:
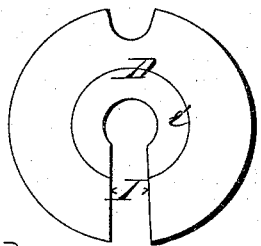

In the accompanying drawings, Figure 1 is a sectional view. Fig. 2 is a face view of a slitted washer.

E shows the thickness of the door. B is the rod or spindle; A, the knob; G, the knob-shank; C, the sleeve or clutch; D, the washer; F, the escutcheon. e is a square projection from the end of the knob-shank, the depth of which is designed to be about equal to the thickness of the slitted washer D. The independent piece of metal (the sleeve or clutch C) which embraces the spindle at the square portion is so cut as to nearly correspond with and fill the depression left in the end of said knob-shank, so that after the knob is turned onto the screw of the spindle to its proper place for the thickness of the door, the sleeve or independent piece of metal C is brought into coupling with the knob-shank G, the slitted washer D inserted onto the spindle B between said independent piece of metal C and the door, and the escutcheon F brought forward over the washer C and secured in that position in the usual way by the screws i, thus effectually adjusting and securing the knob A and washer D onto the spindle in the best and most thorough manner.

I have also shown another modified manner or mode of producing the same result. D' is a washer, the hole of which is large enough to secure the square rod or spindle B. The knob-shank G is provided with a slit in the end thereof (close to the side of the square orifice for the spindle) to receive a pin or key, H, just one side of the rod or spindle B. The washer D' is first put onto the spindle, and the knob-shank (having the escutcheon F thereon) is turned onto the spindle B close up to the washer D', and the escutcheon F brought forward over the washer and key D' H, and secured in that position in the usual way by the screws i, thereby rendering the heretofore irksome modes of adjusting door-knobs on their spindles to the thickness of the door easy, convenient, and durable.

The advantage of this improvement in practical use is believed to be so obvious that any further remark thereon is unnecessary. I believe I have thus shown the nature, construction, and operation, so that a person skilled can make therefrom.

What I claim, therefore, as of my own invention, and desire to secure by Letters Patent, is—

The employment of a slitted washer, D, in combining the knob with a threaded spindle, by means of an independent piece of metal which embraces the spindle at its square portion and engages with the end of the shank of the knob, substantially in the manner and for the purposes set forth herein.

EMERY PARKER.

Witnesses:
ALFRED S. ROBINS,
JEREMY W. BLISS.